United States Patent
Liu et al.

(10) Patent No.: US 11,149,104 B2
(45) Date of Patent: Oct. 19, 2021

(54) PREPARATION METHOD OF TEMPERATURE/PH-RESPONSIVE POLYCARBOXYLIC ACID

(71) Applicant: BEIJING UNIVERSITY OF TECHNOLOGY, Beijing (CN)

(72) Inventors: Xiao Liu, Beijing (CN); Qian Xu, Beijing (CN); Ziming Wang, Beijing (CN); Guanghong Lai, Beijing (CN); Jianan Guan, Beijing (CN); Shanshan Qian, Beijing (CN); Xiabing Bai, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 192 days.

(21) Appl. No.: 16/571,017

(22) Filed: Sep. 13, 2019

(65) Prior Publication Data

US 2020/0223970 A1 Jul. 16, 2020

(30) Foreign Application Priority Data

Jul. 26, 2018 (CN) .......................... 201810835164.4
Jul. 26, 2018 (CN) .......................... 201810835977.3

(51) Int. Cl.
*C08F 265/04* (2006.01)
*C04B 24/26* (2006.01)
*C08F 8/12* (2006.01)
*C08F 2/06* (2006.01)
*C08F 2/40* (2006.01)
*C04B 103/30* (2006.01)
*C04B 103/00* (2006.01)

(52) U.S. Cl.
CPC ............ *C08F 265/04* (2013.01); *C04B 24/26* (2013.01); *C08F 2/06* (2013.01); *C08F 2/40* (2013.01); *C08F 8/12* (2013.01); *C04B 2103/006* (2013.01); *C04B 2103/302* (2013.01)

(58) Field of Classification Search
CPC .. C08F 265/04; C08F 2/06; C08F 2/40; C08F 8/12; C04B 24/26; C04B 2103/00
See application file for complete search history.

(56) References Cited

U.S. PATENT DOCUMENTS

| | | | | |
|---|---|---|---|---|
| 4,547,550 A | * | 10/1985 | Melby | ................... C08F 259/04 525/205 |
| 8,912,299 B2 | * | 12/2014 | Liu | ..................... C04B 24/2647 526/323.2 |
| 9,453,097 B2 | * | 9/2016 | Liu | ........................... C08F 8/12 |
| 2013/0291764 A1 | * | 11/2013 | Mehalebi | ............ C04B 40/0039 106/808 |

FOREIGN PATENT DOCUMENTS

| | | |
|---|---|---|
| CN | 1648098 A | 8/2005 |
| CN | 103204981 B | 6/2015 |
| CN | 103803840 B | 5/2016 |
| CN | 106082758 A | 11/2016 |
| CN | 106632925 | 5/2017 |
| CN | 107033291 A | 8/2017 |

* cited by examiner

*Primary Examiner* — Robert D Harlan
(74) *Attorney, Agent, or Firm* — J.C. Patents (57) ABSTRACT

A preparation method of comb structure temperature/pH-responsive polycarboxylic acid adopts acrylic ester, temperature/pH-responsive monomer and other raw materials to obtain polycarboxylic acid via acrylate monomer self-polymerization, grafting with temperature/pH-responsive monomers and hydrolyzation. In other words, acrylate is used as the reaction monomer to polymerize polyacrylate with controllable molecular weight under the action of initiator and chain transfer agent, then the graft copolymers are copolymerized with temperature/pH-responsive monomers to obtain graft copolymers with acrylate polymers main chain and temperature/pH-responsive polymer side chains. Finally, the graft copolymer is hydrolyzed to obtain the comb structure temperature/pH-responsive polycarboxylic acid with polyacrylic acid main chain and temperature/pH-responsive monomer side chain.

2 Claims, 5 Drawing Sheets

PREPARATION METHOD OF TEMPERATURE/PH-RESPONSIVE POLYCARBOXYLIC ACID

CROSS-REFERENCE TO RELATED APPLICATION

This application claims the priority benefit of Chinese applications serial No. 201810835164.4, filed on Jul. 26, 2018 and serial No. 201810835977.3, filed on Jul. 26, 2018, which are hereby incorporated herein by reference in their entirety.

TECHNICAL FIELD

The present disclosure relates to a preparation method of comb structure temperature/pH-responsive polycarboxylic acid for cement concrete, especially relates to a specific preparation method for the synthesis of comb structure polycarboxylic acid material. The preparation process mainly includes: acrylate monomers after self-polymerization grafts with temperature/pH-responsive monomers and hydrolyzing at last.

BACKGROUND ART

Concrete is one of the most widely used building materials in the field of architectural engineering and it is an important structural engineering material also, but it is easy to shrink and deform under dry environment that resulting in cracking and other defects of hardened concrete. The cracking of large foundation scaleboard, exterior wall of buildings, underground structure, floor plate and beam is a common quality problem of construction project. The types of concrete is changing quickly with the continuous development of green and high strength concrete. However, cracking problem has been paid more and more attention by people in the industry, the damage caused by cracking is difficult to estimate which makes it become a major problem in the field. So it is urgent to restrain the cracking of concrete in engineering. There are many reasons result in cracking, in addition to the impact of design and construction, temperature shrinkage, self-shrinkage, drying shrinkage and plastic shrinkage are the common causes of concrete cracking. Although the shrinkage of concrete is not severe, but the damage caused by it is extremely serious which can reduce the overall strength of concrete and affect the aesthetic. The cracks will make air and water into the interior of concrete which resulting in the acceleration of cracking shrinkage, and then sulfate corrosion, carbonization corrosion and steel corrosion is occurred; in cold climates, freeze-thaw cycles will occur which reduce the durability of concrete and shorten the service life of buildings.

With the rapid development of high performance concrete, the requirement of mechanical strength and durability of concrete are highly increased, the cracking shrinkage of concrete is one of the difficult problems that can not be solved effectively in concrete engineering, especially for high performance concrete with high doping amount of unilateral active addition and small water-binder ratio, such kind of common engineering quality problem is the main factor affecting the durability of concrete. Concrete shrinkage have some negative effects such as: cracking of concrete structure, lower the resistance to chemical corrosion and freeze-thaw damage. Thus, the durability of concrete is weakened which directly affects the life of buildings; In severe cases, concrete may lose its use function. Therefore, to control and reduce cracks is the premise of HPC to ensure its service capacity.

Concrete shrinkage can be divided into plastic shrinkage, self-shrinkage, drying shrinkage, temperature shrinkage and carbonization shrinkage, wherein the most common effect is drying shrinkage. During the process of drying shrinkage, its internal moisture which exists in interspace, large pore, capillary pore and gel pore of the concrete losses continuously. Wherein the water losses from capillary pore and gel pore is closely related to the concrete cracks. With the gradual loss of pore water in capillary and gel, the curvature radius of residual water in pore decreases and the tension of capillary pore increases continuously. When the shrinkage stress on the pore wall is greater than the tensile strength of concrete, micro-cracks begin to appear on the concrete surface, and continue to expand into macroscopic cracks with the increase of stress.

It is well known that amphiphilic block copolymers can form ordered polymers by self-assembly through affinity and disaffinity interactions in specific environments which have become the research hotspot in drug control and release, biomaterials and nanoengineering. In particular, some copolymer materials with environmental response characteristics (such as photosensitivity, temperature sensitivity and pH sensitivity) can achieve their own hydrophilic/hydrophobic changes with the change of external environment which have broad prospects for development in many area. When thermally responsive polymers are used as ideal materials, they exhibit the lowest critical solution temperature (LCST) by responding to the changes of environment temperature. It is a kind of environmentally responsive polymer that has been studied extensively.

The continuous development of molecular structure design and synthesis methods in polymer science provides a theoretical basis for us to tailor the ideal polymer structure. Temperature-responsive comb polymers are becoming more and more popular among researchers in recent years due to its' better performance such as high solubility, low viscosity, versatility, high reactivity and large space volume. Therefore, we introduced the temperature-responsive monomer into the side chain of polycarboxylic acid macromolecules to design and synthesize the comb structure temperature-responsive polycarboxylic acid, good anchoring adsorption and hydrophilic/hydrophobic response can be achieved by synergistic action of the main and side chain. This type of polycarboxylic acid materials have broad application prospects in adhesives, dispersants, solvents, surfactants and other polymer additives as well as green chemicals, biomedical materials and electronic information materials.

the self-assembly and hydrophilic/hydrophobic transition behaviors of environmentally responsive multi-block copolymers in a specific environment have the responsiveness and sensitivity to the external environment which is a research hotspot in the area of polymer surface interface chemistry. Self-assembly of polymers is a process in which macromolecules spontaneously construct aggregates of special shapes and structures under the interaction of hydrogen bond, van der Waals force and electrostatic force. The combined action of blocks will lead to the formation of molecular aggregates with various morphological structures, which has the potential to realize the hydrophilic/hydrophobic intelligent response characteristics. In recent years, a large number of literatures have disclosed in detail of self-assembly behavior of amphiphilic block copolymers in selective solvents and its corresponding hydrophilic/hydrophobic transformation behavior which is widely used in sewage treatment, environment purification and drug delivery.

Comb polymers are more and more favored by researchers because they can give full play to the performance advantages of main chain and side chain of macromolecules. Therefore, pH-responsive monomer is introduced into the side chain of polycarboxylic acid macromolecules to design and synthesize comb structure pH-responsive polycarboxylic acid. Good anchorage adsorption and hydrophilic/hydrophobic response can be achieved by the interaction of main and side chains. This kind of polycarboxylic acid materials not only have various properties of traditional polycarboxylic acid materials, but also have the characteristic advantages of pH-responsive ability which shows a broad application value.

Chinese patent CN 107033291A (publication date: Aug. 11, 2017) disclosed a concrete shrinkage reducing agent, its preparation and application, its preparation method includes the following steps: APEG, initiator and water are mixed evenly to get the first reactant; mix acrylic acid with water to get the second reactant; the third reactant is obtained by mixing diethylene glycol monobutyl methacrylate ester with phellandrene; mix the reducing agent, chain transfer agent and water to get the fourth reactant; the second, third and the fourth reactant is added to the heated first reactant at the same time to react, keep warm after all drops are added, the final product is introduced into alkaline solution and water to obtain the concrete shrinkage reducing agent. The concrete shrinkage reducing agent prepared by the invention can enhance its water-reducing and shrinkage reducing function, improve the frost resistance, compressive strength and crack resistance of concrete, extend the service life of concrete, reduce the production cost of concrete which has a wide range of applications. But the raw material used in the invention is APEG which belongs to the derivative of epoxy alkanes. Therefore, similar to other kinds of shrinkage reducing agent, it is easy to be restricted by the supply of raw materials, thus affecting the production and application of products.

Chinese patent CN 103204981B (publication date: Jun. 10, 2015) disclosed a synthesis method of polylactic acid-b-poly-N-isopropyl acrylamide temperature-responsive material which belongs to the technical field of preparation of amphiphilic block copolymer. 4(2-hydroxyethyl) phenylporphyrins initiates ring-opening polymerization of L-lactide, star poly (lactic acid) is prepared with porphyrins as the core and hydroxylated, then the macromolecular chain transfer agent is obtained by esterification reaction. New polylactic acid-b-poly-N-isopropyl acrylamide temperature-responsive material is obtained by reversible addition-fragmentation chain transfer of macromolecular chain transfer agent and temperature-responsive monomer. The invention provides a method for the preparation of a temperature responsive multiblock copolymer by means of a mild polymerization condition which makes up for the deficiency of the existing multi-block copolymer in environmental response characteristics. However, the production process of the invention is tedious and the cost is high, moreover, the unique comb molecular structure is not introduced and the temperature response characteristics are not applied to the shrinkage reduction performance of cement concrete.

Chinese patent CN 103803840B (publication date: May 4, 2016) disclosed the application of hyperbranched polymer in shrinkage reduction of cement concrete. The patent first synthesized a hydroxy-terminated hyperbranched polymer, and then introduced a polyoxyethylene alkyl or polyethylene glycol chain segment to the end of the hyperbranched polymer to synthesize a hyperbranched concrete shrinkage reducing agent. The hyperbranched concrete shrinkage reducing agent has an excellent performance is applied to the concrete shrinkage reducing field, which has the advantages of: good shrinkage reducing effect and little influence on concrete strength, less dosage, lower cost, simple synthesis and easy industrialization. But the material used in the invention is polyoxyethylene alkyl or polyethylene glycol which belongs to the derivative of epoxy alkanes. Therefore, similar to other kinds of shrinkage reducing agent, it is easy to be restricted by the supply of raw materials, thus affecting the production and application of products.

Chinese patent CN 106082758A (publication date: Nov. 9, 2016) disclosed a shrinkage reducing agent for concrete and its preparation method thereof. The patent first mixes polyacrylamide, montmorillonite, illite and polypropylene evenly, then sodium hydroxide aqueous solution and polycarboxylic acid water reducing solution are added successively, the polymer solution is obtained after uniform dispersion and dissolution, adjust the pH value to 7-9; the shrinkage reducing agent for concrete can be obtained after drying and crushing under 50-70° C. The invention utilizes the water storage performance of layered silicate structures of montmorillonite and illite, takes polymer materials as the carrier, evenly disperses layered silicate materials in polymer materials and stirs them in concrete after being fully filled with water, these polymer particles plays a role in adjusting the humidity inside concrete, such as protecting collapse during the concrete mixing stage, cracking resistance and contraction during the hardening stage. However, the shrinkage reducing agent did not achieve polymer functionalization by molecular structure design method so that precise design and regulation improvement are still needed.

Chinese patent CN 1648098A (publication date: Aug. 3, 2005) disclosed a chemical admixture for inhibiting shrinkage of concrete. It appears colorless or pale yellow liquid at room temperature and soluble in water which is composed of many organic compounds, including unit alcohol, polyols and polyols ethers. The shrinkage reducing agent reported in this patent does not cause the mortar to be sticky when mixed in cement mortar, but can improve the flow of mortar; however its water reduction rate is very low that can not be usually considered; the performance of the shrinkage reducing agent to the mortar concrete is slightly improved and the other mechanical properties are slightly reduced; when the shrinkage reducing agent is used in concrete, its content accounts for 0.5% to 2% of the total proportion. This shrinkage reducing agent can significantly reduce the dry shrinkage of mortar concrete, reduce the shrinkage deformation of concrete's self-generated volume, and even change the concrete from shrinkage type to expansion type. However, the reported shrinkage reducing agent does not have pH-responsive characteristics, and it cannot achieve the effect of shrinkage and crack resistance spontaneously through the change of environmental pH value, nor can it achieve the purpose of polymer functionalization by molecular structure design method.

Chinese patent CN 106632925A (publication date: May 10, 2017) disclosed a preparation method of pH sensitive amphiphilic polyblock copolymer. A kind of macromolecular chain transfer agent poly (tert-butyl acrylate) is synthesized by reversible addition-broken chain transfer polymerization, then process RAFT polymerization with dimethylaminoethyl methacrylate and glycol methyl ether methacrylate to obtain amphiphilic polyblock copolymers P(tBA)-b-P(DMAEMA-co-PEGMA). In aqueous solution, the polyblock copolymer can self-assemble to form micelles and is pH sensitive with a critical value of pH-responsive at 7. The invention has high polymerization yield, wide application range of monomers, pH sensitivity and wide application prospect which can be used in the fields of: chemical production such as dye adsorption, environmental protection such as heavy metal pollution treatment, and biological medicine such as the controllable release of insoluble drugs. The invention provides a preparation method of pH sensitive polyblock copolymer, which makes up for the deficiency of the existing polyblock copolymer in environmental response characteristics. However, the production process of the invention is tedious, the production cost is high, and the pH response characteristic is not applied in the field of improving the shrinkage performance of cement concrete.

The polymers or mixtures disclosed in most patents are exhibited excellent shrinkage and cracking resistance. However, the design synthesis methods above have some deficiencies such as the researchers mainly focus on achieving excellent performance by changing reaction sequence or process conditions, but seldom achieve excellent application performance by changing polymer structure through molecular structure design. The application of active polymerization methods such as reversible adduction-broken chain transfer polymerization in concrete is limited by the harsh reaction conditions and special catalytic system, however, It has been proved that the design and synthesis of comb macromolecular structure and the introduction of temperature-responsive block side chain can synergistically improve the polymer's multiple properties. Therefore, this requires the synthesis of temperature-responsive polycarboxylic acid materials not only to achieve better environmental response characteristics, but also to ensure that the reaction raw materials are commonly available with convenient process steps, low preparation costs and conducive to industrial application. This is not reported in the world.

The above design and synthesis methods also have some other deficiencies such as the researchers mainly focus on reducing shrinkage and cracking of concrete by modifying water-reducing agents or alcohol blending, but seldom use polymers to change hydrophilic and hydrophobic properties in response to environmental changes, the hydrophobic effect of materials from inside to outside is not achieved. RAFT and other active polymer synthesis methods have limited their application in the field of concrete water reducer due to the harsh reaction conditions and special catalytic system, and it has been proved that the design and synthesis of comb macromolecular structure and the introduction of pH-responsive block side chain can significantly improve the performance and efficacy of the polymer. Therefore, this requires the synthesis of pH-responsive polycarboxylic acid materials to achieve molecular structure innovation which not only have the performance of reducing shrinkage, crack resistance and other application properties according to the changes in the pH environment of cement concrete, but also to ensure the reaction raw materials are commonly available with convenient process steps, low preparation costs and conducive to industrial application. This is not reported in the world.

SUMMARY

The purpose of the invention is to provide a comb structure preparation method of temperature/pH-responsive polycarboxylic acid, polyacrylate is obtained by means of: acrylate monomers after self-polymerization graftes with temperature/pH-responsive monomers under the action of initiator, then comb structure temperature/pH-responsive polycarboxylic acid with excellent performance is obtained through hydrolysis. The invention introduces a temperature/pH-responsive polymer side chain based on molecular structure design theory. It not only ensures the anchoring adsorption characteristics of traditional polycarboxylic acid, but also increases the temperature/pH response characteristics. It also achieves multiple work effects, enriches the application of polymer molecular structure design method and structure-performance research in the field of concrete. Comb structure polycarboxylic acid synthesized by this method has smaller atomic spatial arrangement size and intermolecular interaction. It has multi-term side chains which repel each other and more stretch to obtain strong steric hindrance effect and temperature response hydrophobic property, at the same time, based on the pH response effect, the hydrophobicity of capillaries inside cement concrete can be controlled to further realize the effect of reducing shrinkage and cracking of cement concrete which shows better intelligent response value and broad development prospect than traditional polycarboxylic acid reducing agent.

The invention provide a preparation method for synthesizing comb structure temperature/pH-responsive polycarboxylic acid materials by means of self-polymerization, grafting and hydrolysis, including the following steps:

(1) Self-Polymerization:

Firstly, organic solvent, acrylate and chain transfer agent is added to the reactor, heat up to 50-120° C. with agitation; then introduce a mixture solution of initiator and organic solvent for 1-12 hours, the self-polymerization product polyacrylate solution is obtained by reacting at a constant temperature of 50-120° C. for 1-6 hours after the dropping.

(2) Graft Copolymerization:

Adjust the temperature of self-polymerization products obtained in (1) to 50-100° C., molecular weight regulator is added with 15-40 minutes agitation until the mixture is evenly mixed; then add the temperature/pH-responsive monomer and the mixture solution of initiator and organic solvent for 1-12 hours; after dropping, the reaction is kept at a constant temperature of 50-100° C. for 1-6 hours to obtain the graft copolymerization products after removing organic solvent by decompress distillation.

(3) Hydrolysis Reaction

The graft copolymerization products in (2) is mixed with deionized water and heat to 30-80° C. with agitation, inorganic alkali is added and hydrolyze for 10-150 minutes; then process decompress distillation to remove water solvent and by-products, after drying, solvent water is added to obtain the desired concentration of temperature/pH-responsive polycarboxylic acid solution.

Organic solvents used in the self-polymerization reaction described in step (1) is: tetrahydrofuran, N,N-dimethyl formamide, aniline, cyclobutyl sulfoxide or dimethyl sulfoxide, the mass ratio of organic solvent to acrylate is 1-12:1; the acrylate used in the method is: methyl acrylate, ethyl acrylate, propyl acrylate, butyl acrylate or amyl acrylate; the chain transfer agent used in the method is: Isopropanol, isooctyl 3-mercapto propionate, 2-mercapto ethanol, or 3-mercapto propanol, the molar ratio between the amount of chain transfer agent and acrylate is 0.05-0.6:1; the initiator used in the method is: azodiisobutyl nitrile, azodiisoheptyl nitrile, dibenzoyl peroxide, tert-butyl peroxide hydrogen peroxide, tert-butyl peroxide benzoate or tert-butyl peroxide, the molar ratio of initiator amount to acrylate is 0.05-0.2:1; In the mixture solution of initiator and organic solvent, the organic solvents is: tetrahydrofuran, N,N-dimethyl formamide, aniline, cyclobutyl sulfoxide or dimethyl sulfoxide, the mass fraction of initiator in mixed solution is 5-50%.

Molecular weight regulators used in the graft copolymerization reaction described in (2) is: N-dodecyl mercaptan, tertiary dodecyl mercaptan, mercaptoacetic acid or 3-mercaptopropionic acid, the molar ratio between the amount of molecular weight regulator and temperature/pH-responsive monomer is 0.05-0.3:1; temperature-responsive monomer used in the method is: N-Isopropyl acrylamide, N-n-propylacrylamide, N-tert-Butyl acrylamide, N, N'-methylene bisacrylamide, N,N-dimethylacrylamide, the molar ratio between the amount of temperature-responsive monomer and acrylate in (1) is 2-10:1; pH-responsive monomer used in the method is: dimethylamino-ethyl acrylate, dimethylamino-ethyl methacrylate, diethylamino-ethyl methacrylate, 2-vinyl pyridine, 4-vinyl pyridine or N, N-diethyl-2-acrylamide, the molar ratio between the amount of pH-responsive monomer and acrylate in (1) is 2-10:1; initiators used in the method is: azodiisobutyl nitrile, azodiisoheptyl nitrile, dibenzoyl peroxide, tert-butyl peroxide hydrogen peroxide, tert-butyl peroxide benzoate or tert-butyl peroxide, the molar ratio between the amount of initiator and temperature/pH-responsive monomer is 2-10:1; the organic solvent In the mixture solution of initiator and organic solvent is: tetrahydrofuran,N, n-dimethyl formamide, aniline, cyclobutyl sulfoxide or dimethyl sulfoxide, the mass fraction of initiator in mixed solution is 5-50%.

Molar ratio between the amount of deionized water used in the hydrolysis reaction described in (3) and acrylate in step (1) is 1-10:1; inorganic base is sodium hydroxide or potassium hydroxide, and the molar ratio between the amount of inorganic base and deionized water is 0.001-0.02:1.

The comb structure temperature/pH-responsive polycarboxylic acid according to claim 1, comprising: its structural expression is:

As for comb structure temperature-responsive polycarboxylic acid, $R_1$ represents N-isopropyl amide, N-Isopropyl methyl amide, N-n-propyl amide, N-tert-butyl amide, N,N'-methylene acrylamide amide, N,N-dimethyl amide; $R_2$ represents hydrogen or methyl.

As for pH-responsive polycarboxylic acid with comb structure, $R_1$ represents dimethylamino ethoxycarbonyl, lignocaine ethoxycarbonyl, 2-pyridyl, 4-pyridyl, or N, N-diethyl-2-amide; $R_2$ represents hydrogen or methyl.

Wherein "a" and "b" are positive integers which indicating the number of repeating units distributed randomly in the aggregation. a:b is 0.1-10:1.

Wherein "n" is a positive integer which indicating the number of repeat units in the side chain. The range of n is 5-120.

Temperature/pH-responsive polycarboxylic acid prepared by the method has a typical comb structure, the polyacrylic acid main chain is adsorbed on cement particles and the temperature/pH-responsive polymer side chain exhibits excellent hydrophilic and hydrophobic conversion characteristics in response to the ambient temperature/pH, which can increase the contact angle of liquid bending surface of capillary inside cement concrete and reduce capillary pressure. Furthermore, the effect of restraining shrinkage and cracking of cement concrete is realized.

A comb structure temperature/pH-responsive polycarboxylic acid material with polyacrylic acid main chain and temperature/pH-responsive polymer side chain is formed based on the molecular structure design theory through the self-polymerization of acrylate monomers, grafting copolymerization and hydrolysis reaction. The new structure prepared is similar to the traditional polycarboxylic acid water reducer with comb structure, It can not only realize the transformation of polycarboxylic acid material in application performance, but also be helpful to expand the theoretical connotation of polymer molecular design-structure-performance. It is also an another innovation and breakthrough in the field of polymer for cement and concrete as well as provides research ideas and technical guidance for the further development of new polycarboxylic acid materials.

The temperature-responsive polycarboxylic acid material in the invention has the following beneficial effects compared with the existing technology:

1. From the perspective of molecular structure, the temperature-responsive polycarboxylic acid material synthesized by the invention has a typical comb structure, the polyacrylic acid main chain is anchored on the surface of cement particles, and the temperature-responsive side chain can achieve the remarkable environmental response of hydrophilic and hydrophobic conversion. It shows excellent properties in restraining shrinkage and cracking as well as improving the durability of cement-based materials. The product is a kind of comb structure temperature-responsive polycarboxylic acid material with distinct characteristics and properties that can be widely used in fine chemicals and surfactants and shows a good market prospect and application potential.

2. Compared with the traditional method, the synthesis process of the method is easy to control and the raw material is simple and common, the steps of self-polymerization, grafting copolymerization and hydrolysis used are also ordinary operation means without complicated steps or special reactions. It enriches the preparation method of synthetic functional polycarboxylic acid which has the characteristics of high efficiency, convenience, economy, energy saving, and easy to realize industrial production. The synthesis process has no special requirements for equipment and does not rely on special catalysts. Moreover, it has the advantages of strong molecular designability, controllable molecular weight, narrow molecular weight distribution and high degree of polymerization, so it has a good promotion value.

3. The preparation process of the invention has the advantages of: low cost, low energy consumption, non-toxic, safe and environmental protection, clean and pollution-free. The synthesis process does not need nitrogen protection and organic solvent used in each step can be recycled and reused which greatly saves the preparation cost and conforms to the concept of sustainable synthesis. At the same time, the controllable synthesis activity of raw materials is high, which is conducive to the wide spread and application of synthetic products, also increases the market share of comb structure polycarboxylic acid materials.

4. The temperature-responsive comb structure polycarboxylic acid synthesized by the method of the invention will show intelligent response behavior at different temperatures and the hydrophilic/hydrophobic conversion characteristics can be demonstrated by particle size and transmittance test. It shows excellent performance of inhibiting shrinkage and resisting cracking. The product is stable which can be stored for a long term without deterioration, and have no effect on application performance. While the synthesis method is intelligent and efficient, the resulting products still have excellent performance which is conducive to leading the new trend of the industry, promoting the technical progress of the industry, and has good economic and social benefits.

The pH-responsive polycarboxylic acid material in the invention has the following beneficial effects compared with the existing technology:

1. The synthesized pH-responsive polycarboxylic acid material has a typical comb structure, and the polycarboxylic acid main chain is adsorbed on cement particles. The pH-responsive polymer block side chain plays an excellent role in environmental responsive of hydrophilic/hydrophobic conversion, this kind of comb structure can prevent cracking of cement concrete and improve the stability of hardened concrete. The product is a comb structure pH-responsive polycarboxylic acid material with unique advantages that showing a good application prospect and market competitiveness.

2. Compared with the traditional method, the synthesis process of the method is easy to control and the raw material is simple and common, the steps of self-polymerization, grafting copolymerization and hydrolysis used are also ordinary operation means without using special operations and expensive reagents. The preparation does not rely on the epoxidane compounds and their derivatives with no special requirements for the synthesis equipment and experimental environment which is easy to achieve industrial production.

3. The preparation process of this product is characterized by low energy consumption, safety and environmental protection, mild conditions, clean and pollution-free, non-toxic and harmless with simple and feasible synthesis method. The organic solvent does not need to be removed after the self-polymerization, graft copolymerization reaction can be carried out directly and the organic solvent removed after graft polymerization can be recycled after condensation recovery which greatly reduce the waste of raw materials and reduce production costs. At the same time, the range of applicable molecular weight of acrylate and pH-responsive monomer is wide, which enriches the diversity of raw materials, improves the competitiveness of products and development prospects.

4. The pH-responsive polycarboxylic acid synthesized by the invention has a good shrinkage and crack resistance effect on cement concrete materials. It also exhibits a good shrinkage inhibition ability at a low dosage and consistent regularity at different ages. In addition, the appearance of the product is a clear homogeneous solution, the system state is stable, and not stratified at high concentrations. The synthetic method has the advantages of simplicity and directness and the synthesized products have excellent performance which are conducive to market promotion. It has a good economic benefits as well as application prospects.

DESCRIPTION OF THE PREFERRED EMBODIMENTS

Figure 1:
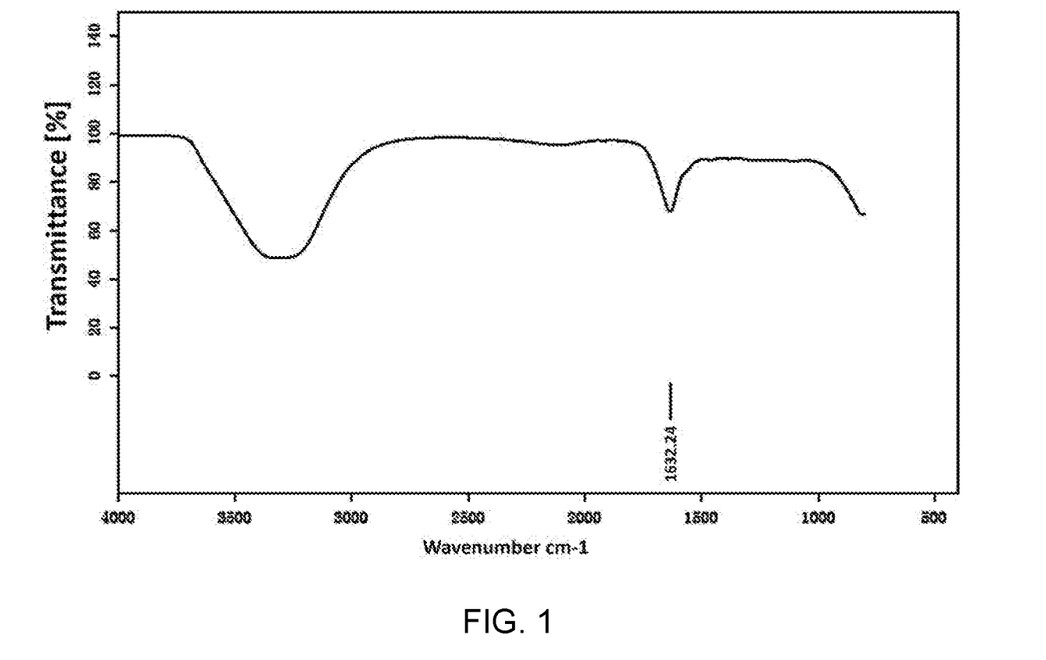
FIG. 1 is the infrared spectrum of temperature-responsive polycarboxylic acid with comb structure at the temperature T=40° C. in embodiment 1.
Figure 2:
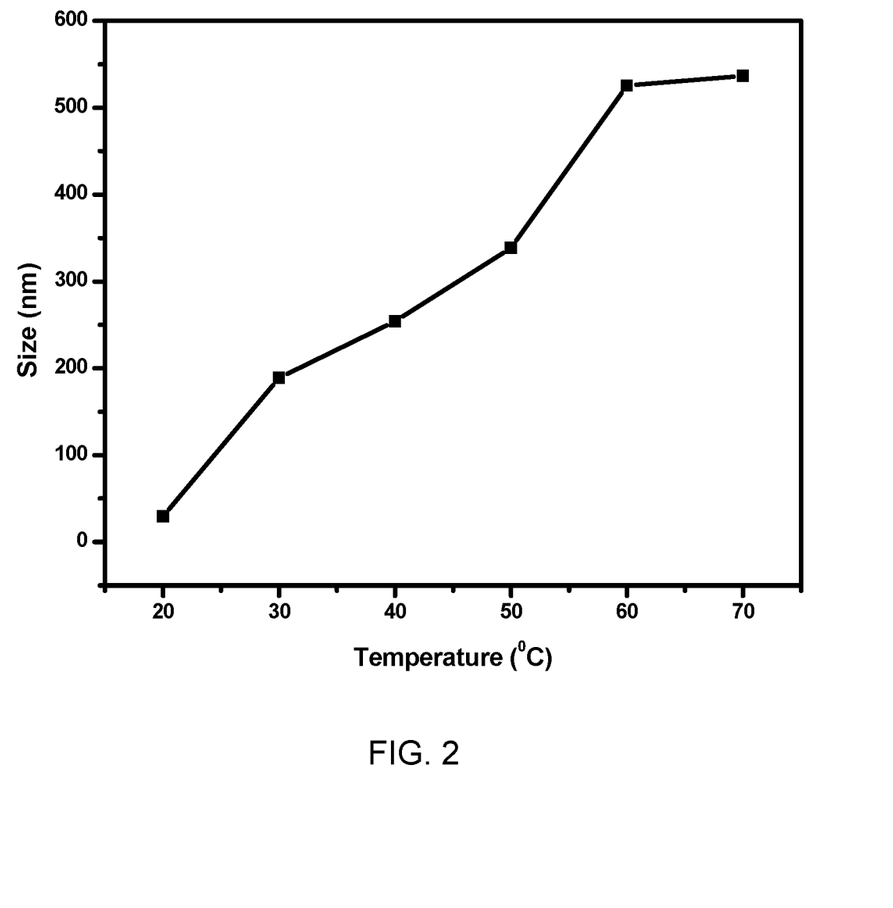
FIG. 2 shows the variation of particle size of temperature-responsive polycarboxylic acid with comb structure with temperature in embodiment 1. The temperatures are 20° C., 30° C., 40° C., 50° C., 60° C., 70° C. respectively.
Figure 3:
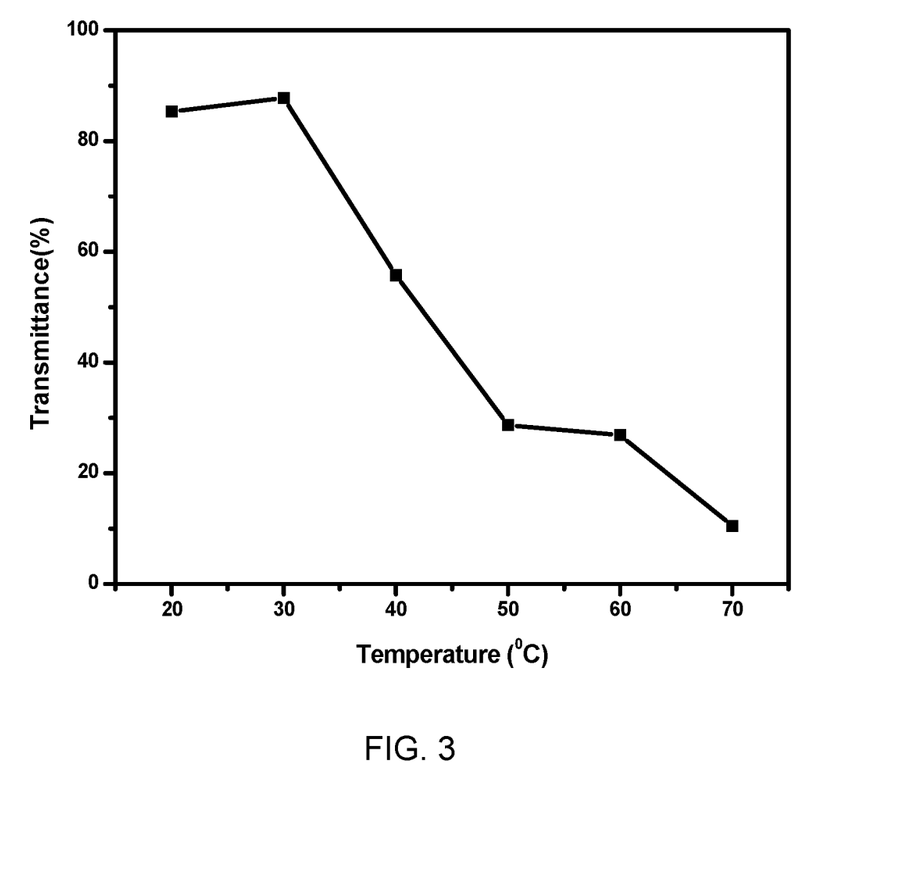
FIG. 3 shows the variation of the transmittance of a temperature-responsive polycarboxylic acid with comb structure with temperature in embodiment 1. The temperatures are 20° C., 30° C., 40° C., 50° C., 60° C., 70° C. respectively.
Figure 4:
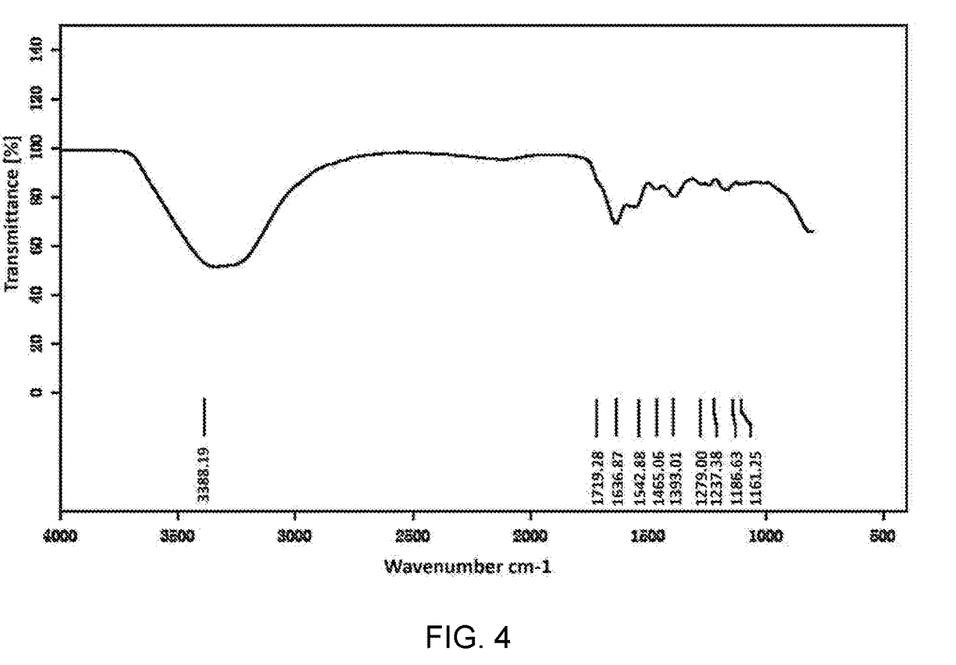
FIG. 4 is the infrared spectrum of pH-responsive polycarboxylic acid with comb structure when pH=11 in embodiment 7.
Figure 5:
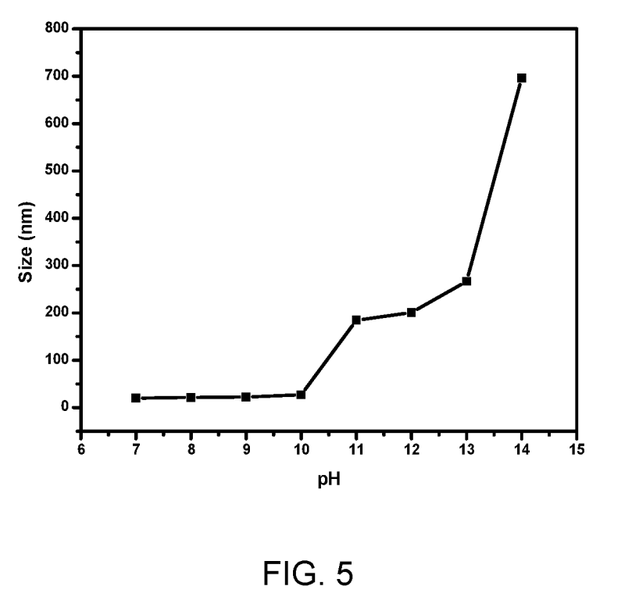
FIG. 5 shows the variation of particle sizes of pH-responsive polycarboxylic acid with comb structure with pH value in example 7. PH values are 7, 8, 9, 10, 11, 12, 13 and 14, respectively.
Figure 6:
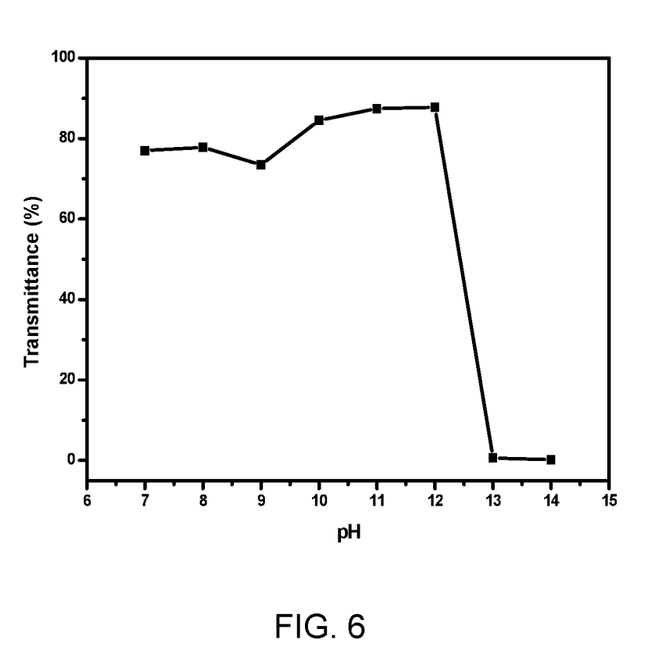
FIG. 6 shows the variation of the transmittance of pH-responsive polycarboxylic acid with comb structure with the pH value in example 7. The pH values are 7, 8, 9, 10, 11, 12, 13 and 14, respectively.

The invention is further described in detail in the following embodiment, but the implementation of the invention is not limited to this.

Embodiment 1

Firstly, 30 g tetrahydrofuran, 30 g methyl acrylate and 12.54 g isopropanol is added into the reactor, heat to 50° C. with agitation, then add a mixture solution which consist of 2.86 g azodiisobutyronitrile and 2.86 g tetrahydrofuran for 12 h. After dropping, continue reaction for 6 h at a constant temperature of 50° C. to obtain self-polymerization product polymethyl acrylate solution. Adjust the temperature of the obtained self-polymerization products at 50° C. and add 35.22 g n-dodecyl mercaptan with 40 minutes agitation until the mixture is evenly mixed, then add a mixture solution which consist of 393.80 g N-isopropyl acrylamide, 28.57 g azodiisobutyronitrile and 28.57 g tetrahydrofuran for 12 h. After dropping, continue reaction for 6 h at a constant temperature of 50° C., then process decompressed distillation to remove tetrahydrofuran to obtain the graft copolymerization products. Mix 423.80 g graft copolymerization products with 62.64 g deionized water, heat to 30° C. with agitation and add 0.14 g sodium hydroxide to hydrolyze for 150 minutes, then process decompress distillation to remove water solvent and by-products. The temperature-responsive polycarboxylic acid solution with 60% mass concentration is obtained by adding 282.53 g solvent water after drying.

Embodiment 2

Firstly, 210 g tetramethylene sulfone, 30 g butyl acrylate and 6.47 g 3-mercapto-1-propanol is added into the reactor, heat to 110° C. with agitation and add a mixture solution which consist of 2.53 g tert-butyl hydroperoxide and 10.13 g tetramethylene sulfone for 3 h. After dropping, continue reaction for 2 h at a constant temperature of 110° C. to obtain self-polymerization product polybutyl acrylate solution. Adjust the temperature of the obtained self-polymerization products to 90° C., add 24.85 g 3-mercaptopropionic acid with 20 minutes agitation until the mixture is evenly mixed, then add a mixture solution which consist of 148.68 g N-n-tert-butyl acrylamide, 12.66 g tert-butyl hydroperoxide and 50.63 g tetramethylene sulfone for 3 h. After dropping, continue reaction for 2 h at a constant temperature of 90° C.

and process decompressed distillation to remove tetramethylene sulfone to obtain the graft copolymerization products. Mix 178.86 g graft copolymerization products with 21.07 g deionized water and heat to 70° C. with agitation, add 0.66 g potassium hydroxide to hydrolyze for 30 minutes and then process decompress distillation to remove water solvent and by-products. The temperature-responsive polycarboxylic acid solution with 50% mass concentration is obtained by adding 178.86 g solvent water after drying.

Embodiment 3

Firstly, 270 g dimethyl sulfoxide, 30 g amyl acrylate and 1.27 g isopropanol is added into the reactor, heat to 70° C. with agitation, then add a mixture solution which consist of 6.56 g tert-butyl peroxybenzoate and 59.02 g dimethyl sulfoxide for 8 h. After dropping, continue reaction for 4 h at a constant temperature of 70° C. to obtain self-polymerization product polyamyl acrylate solution. Adjust the temperature of the obtained self-polymerization products to 80° C., add 32.03 g n-dodecyl mercaptan acid with 25 minutes agitation until the mixture is evenly mixed, then add a mixture solution which consist of 97.59 g N-N'-methylene bisacrylamide, 19.67 g tert-butyl peroxybenzoate and 177.04 g dimethyl sulfoxide for 6 h. After dropping, continue reaction for 3 h at a constant temperature of 80° C. and process decompressed distillation to remove dimethyl sulfoxide to obtain the graft copolymerization products. Mix 127.56 g graft copolymerization products with deionized water and heat to 60° C. with agitation, add 0.38 g sodium hydroxide to hydrolyze for 60 minutes, then process decompress distillation to remove water solvent and by-products. The temperature-responsive polycarboxylic acid solution with 40% mass concentration 191.34 g is obtained by adding solvent water after drying.

Embodiment 4

Firstly, 150 g aniline, 30 g propyl acrylate and 8.21 g 2-mercapto ethanol is added into the reactor, heat to 90° C. with agitation and add a mixture solution which consist of 6.37 g dibenzoyl peroxide and 14.85 g aniline for 6 h. After dropping, continue reaction for 3 h at a constant temperature of 90° C. to obtain self-polymerization product polypropyl acrylate solution. Adjust the temperature of the obtained self-polymerization products to 70° C. and add 25.42 g thioglycolic acid with 30 minutes agitation until the mixture is uniform, then add a mixture solution which consist of 208.15 g N-propylacrylamide, 44.56 g benzoyl peroxide and 103.98 g aniline for 8 h. After dropping, continue reaction for 4 h at a constant temperature of 70° C., then process decompressed distillation to remove aniline to obtain the graft copolymerization products. Mix 238.15 g graft copolymerization products with 33.11 g deionized water and heat to 50° C. with agitation, add 0.37 g sodium hydroxide to hydrolyze for 90 minutes, then process decompress distillation to remove water solvent and by-products. The temperature-responsive polycarboxylic acid solution with 50% mass concentration is obtained by adding 238.15 g solvent water after drying.

Embodiment 5

Firstly, 360 g tetrahydrofuran, 30 g methyl acrylate and 3.81 g Isooctyl 3-mercaptopropionat is added into the reactor and heat to 120° C. with agitation, then add a mixture solution which consist of 10.19 g ditert butyl peroxide and 193.65 g tetrahydrofuran for 1 h. After dropping, continue reaction for 1 h at a constant temperature 120° C. to obtain self-polymerization product polymethyl acrylate solution. Adjust the temperature of the obtained self-polymerization products to 100° C. and add 42.32 g tert-dodecylthiol with 15 minutes agitation until the mixture is evenly mixed, then add a mixture solution which consist of 69.09 g N-N-dimethylacrylamide, 20.39 g di-tert-butyl peroxide and 387.31 g tetrahydrofuran for 1 h. After dropping, continue reaction for 1 h at a constant temperature of 100° C., then process decompressed distillation to remove tetrahydrofuran to obtain the graft copolymerization products. Mix 99.09 g graft copolymerization products with 6.27 g deionized water and heat to 80° C. with agitation, add 0.39 g potassium hydroxide to hydrolyze for 10 minutes, then process decompress distillation to remove water solvent and by-products. The temperature-responsive polycarboxylic acid solution with 40% mass concentration is obtained by adding 148.64 g solvent water after drying.

Embodiment 6

Firstly, 90 g N,N-dimethylformamide, 30 g ethyl acrylate and 32.75 g Isooctyl 3-mercaptopropionate is added into the reactor and heat to 60° C. with agitation, then add a mixture solution which consist of 5.96 g azobisvaleronitrile and 8.94 g N,N-dimethylformamide for 10 h. After dropping, continue reaction for 5 h at a constant temperature of 60° C. to obtain self-polymerization product polyethylene acrylate solution. Adjust the temperature of the obtained self-polymerization products to 60° C., add 24.29 g tert-dodecylmercaptan with 35 minutes agitation until the mixture is evenly mixed, then add a mixture solution which consist of 305.23 g N-Isopropylmethacrylamide, 29.80 g azobisvaleronitrile and 44.71 g N,N-dimethylformamide for 10 h. After dropping, continue reaction for 5 h at a constant temperature of 60° C., then process decompressed distillation to remove N,N-dimethylformamide to obtain the graft copolymerization products. Mix 335.23 g graft copolymerization products with 43.20 g deionized water and heat to 40° C. with agitation, add 0.40 g potassium hydroxide to hydrolyze for 120 minutes, then process decompress distillation to remove water solvent and by-products. The temperature-responsive polycarboxylic acid solution with 60% mass concentration is obtained by adding 223.49 g solvent water after drying.

Shrinkage Reduction of Cement Mortar

The proportion of cement mortar materials is: 647 kg/m$^3$ cement, 1293 kg/m$^3$ sand with particle size of 0-2 mm and 453 kg/m$^3$ water, the amount of water reducer adulteration is 0.75% cement content (solid content), set the temperature-responsive polycarboxylic acid solution synthesized by the invention has a solid content is 0.3% of the cement content. Cement mortar without adding temperature-responsive polycarboxylic acid is used as the comparison with the same composition of rest components. The results of shrinkage test of mortar are shown in Table 1.

TABLE 1

| polymer | adulterate amount % | 1 d [mm/m] | 7 d [mm/m] | 14 d [mm/m] | 28 d [mm/m] |
| --- | --- | --- | --- | --- | --- |
| Embodiment 1 | 0.3 | −0.02 | −0.19 | −0.35 | −0.52 |
| Embodiment 2 | 0.3 | −0.13 | −0.40 | −0.55 | −0.74 |
| Embodiment 3 | 0.3 | −0.04 | −0.25 | −0.40 | −0.61 |
| Embodiment 4 | 0.3 | −0.06 | −0.37 | −0.41 | −0.65 |
| Embodiment 5 | 0.3 | −0.12 | −0.40 | −0.53 | −0.68 |

TABLE 1-continued

| polymer | adulterate amount % | 1 d [mm/m] | 7 d [mm/m] | 14 d [mm/m] | 28 d [mm/m] |
|---|---|---|---|---|---|
| Embodiment 6 | 0.3 | −0.08 | −0.39 | −0.45 | −0.63 |
| comparison | 0 | −0.16 | −0.45 | −0.69 | −1.00 |

Table 1 indicates that the temperature-responsive polycarboxylic acid synthesized by the embodiment of the invention can significantly inhibit the shrinkage of cement mortar, this type of polycarboxylic acid uses the temperature response characteristics of the block polymer on the side chain of its macromolecular to achieve the reduction effect which is different from the action mechanism of typical concrete shrinkage reducer. It can be seen from the shrinkage results in table 1 that the temperature-responsive polycarboxylic acid synthesized by the embodiment of the present invention can effectively reduce the drying shrinkage of concrete, the reduction rate is better than the comparison in 1d, 7d, 14d and 28d.

Embodiment 7

Firstly, 90 g N,N-dimethylformamide, 30 g ethyl acrylate and 32.75 g Isooctyl 3-mercaptopropionate is added into the reactor and heat to 60° C. with agitation, then add a mixture solution which consist of 5.96 g azobisvaleronitrile and 8.94 g N,N-dimethylformamide for 10 h. After dropping, continue reaction for 5 h at a constant temperature of 60° C. to obtain self-polymerization product polyethylene acrylate solution. Adjust the temperature of the obtained self-polymerization products to 60° C. and add 24.29 g tert-dodecylmercaptan with 35 minutes agitation until the mixture is evenly mixed, then add a mixture solution which consist of 377.31 g dimethylaminoethyl methacrylate, 29.80 g azobisvaleronitrile and 44.71 g N,N-dimethylformamide for 10 h. After dropping, continue reaction for 5 h at a constant temperature of 60° C., then process decompressed distillation to remove N,N-dimethylformamide to obtain the graft copolymerization products. Mix 407.31 g graft copolymerization products with 43.20 g deionized water and heat to 40° C. with agitation, add 0.40 g potassium hydroxide to hydrolyze for 120 minutes, then process decompress distillation to remove water solvent and by-products. The pH-responsive polycarboxylic acid solution with 60% mass concentration is obtained by adding 271.54 g solvent water after drying.

Embodiment 8

Firstly, 30 g tetrahydrofuran, 30 g methyl acrylate and 12.54 g isopropanol is added into the reactor and heat to 50° C. with agitation, then add a mixture solution which consist of 2.86 g azodiisobutyronitrile and 2.86 g tetrahydrofuran for 12 h. After dropping, continue reaction for 6 h at a constant temperature of 50° C. to obtain self-polymerization product polymethyl acrylate solution. Adjust the temperature of the obtained self-polymerization products to 50° C. and add 35.22 g n-dodecyl mercaptan with 40 minutes agitation until the mixture is evenly mixed, then add a mixture solution which consist of 489.27 g DMAEA, 28.57 g azodiisobutyronitrile and 28.57 g tetrahydrofuran for 12 h. After dropping, continue reaction for 6 h at a constant temperature of 50° C., then process decompressed distillation to remove tetrahydrofuran to obtain the graft copolymerization products. Mix 528.27 g graft copolymerization products with 62.64 g deionized water and heat to 30° C. with agitation, add 0.14 g sodium hydroxide to hydrolyze for 150 minutes, then process decompress distillation to remove water solvent and by-products. The pH-responsive polycarboxylic acid solution with 60% mass concentration is obtained by adding 352.18 g solvent water after drying.

Embodiment 9

Firstly, 270 g dimethyl sulfoxide, 30 g amyl acrylate and 1.27 g isopropanol is added into the reactor and heat to 70° C. with agitation, then add a mixture solution which consist of 6.56 g tert-Butyl peroxybenzoate and 59.02 g dimethyl sulfoxide for 8 h. After dropping, continue reaction for 4 h at a constant temperature of 70° C. to obtain self-polymerization product polyamyl acrylate solution. Adjust the temperature of the obtained self-polymerization products to 80° C. and add 32.03 g n-dodecyl mercaptan with 25 minutes agitation until the mixture is evenly mixed, then add a mixture solution which consist of 66.55 g 4-Vinyl pyridine, 19.67 g tert-butyl peroxybenzoate and 177.04 g dimethyl sulfoxide for 6 h. After dropping, continue reaction for 3 h at a constant temperature of 80° C., then process decompressed distillation to remove dimethyl sulfoxide to obtain the graft copolymerization products. Mix 96.55 g graft copolymerization products with deionized water and heat to 60° C. with agitation, add 0.38 g sodium hydroxide to hydrolyze for 60 minutes, then process decompress distillation to remove water solvent and by-products. The pH-responsive polycarboxylic acid solution with 40% mass concentration is obtained by adding 144.83 g solvent water after drying.

Embodiment 10

Firstly, 210 g cyclobutyl sulfosone, 30 g butyl acrylate and 6.47 g 3-mercapto propanol is added into the reactor and heat to 110° C. with agitation, then add a mixture solution which consist of 2.53 g tert-butyl hydrogen peroxide and 10.13 g cyclobutyl sulfone for 3 h. After dropping, continue reaction for 2 h at a constant temperature of 110° C. to obtain self-polymerization product polybutyl acrylate solution. Adjust the temperature of the obtained self-polymerization products to 90° C. and add 24.85 g 3-thiohydracrylic acid with 20 minutes agitation until the mixture is evenly mixed, then add a mixture solution which consist of 123.07 g 2-vinylpyridine, 12.66 g tert-butyl hydrogen peroxide and 50.63 g cyclobutyl sulfone for 3 h. After dropping, continue reaction for 2 h at a constant temperature of 90° C., then process decompressed distillation to remove cyclobutyl sulfone to obtain the graft copolymerization products. Mix 153.07 g graft copolymerization products with 21.07 g deionized water and heat to 70° C. with agitation, add 0.66 g potassium hydroxide to hydrolyze for 30 minutes, then process decompress distillation to remove water solvent and by-products. The pH-responsive polycarboxylic acid solution with 50% mass concentration is obtained by adding 153.07 g solvent water after drying.

Embodiment 11

Firstly, 360 g tetrahydrofuran, 30 g methyl acrylate and 3.81 g 3-mercapto iso-octyl propionate is added into the reactor and heat to 120° C. with agitation, then add a mixture solution which consist of 10.19 g ditert butyl peroxide with 193.65 g tetrahydrofuran for 1 h. After dropping, continue reaction for 1 h at a constant temperature of 120° C. to obtain self-polymerization product polymethyl acrylate solution. Adjust the temperature of the obtained self-polymerization products to 100° C. and add 42.32 g tert-dodecylmercaptan with 15 minutes agitation until the mixture is evenly mixed, then add a mixture solution which consist of 88.65 g N,N-diethyl-2-acrylamide, 20.39 g ditert-butyl peroxide and 387.31 g tetrahydrofuran for 1 h. After dropping, continue reaction for 1 h at a constant temperature of 100° C., then process decompressed distillation to remove tetrahydrofuran to obtain the graft copolymerization products. Mix 118.65 g graft copolymerization products with 6.27 g deionized water and heat to 80° C. with agitation, add 0.39 g potassium hydroxide to hydrolyze for 10 minutes, then process decompress distillation to remove water solvent and by-products. The pH-responsive polycarboxylic acid solution with 40% mass concentration is obtained by adding 177.97 g solvent water after drying.

Embodiment 12

Firstly, 150 g aniline, 30 g propyl acrylate and 8.21 g 2-mercapto ethanol is added into the reactor and heat to 90° C. with agitation, then add a mixture solution which consist of 6.37 g dibenzoyl peroxide and 14.85 g aniline for 6 h. After dropping, continue reaction for 3 h at a constant temperature of 90° C. to obtain self-polymerization product polypropyl acrylate solution. Adjust the temperature of the obtained self-polymerization products to 70° C. and add 25.42 g thioglycolic acid with 30 minutes agitation until the mixture is evenly mixed, then add a mixture solution which consist of 340.80 g diethylamino-ethyl methacrylate, 44.56 g benzoyl peroxide and 103.98 g aniline for 8 h. After dropping, continue reaction for 4 h at a constant temperature of 70° C., then process decompressed distillation to remove aniline to obtain the graft copolymerization products. Mix 370.80 g graft copolymerization products with 33.11 g deionized water and heat to 50° C. with agitation, add 0.37 g sodium hydroxide to hydrolyze for 90 minutes, then process decompress distillation to remove water solvent and by-products. The pH-responsive polycarboxylic acid solution with 50% mass concentration is obtained by adding 370.80 g solvent waterafter drying.

Shrinkage Reduction of Cement Mortar

The proportion of cement mortar materials is: 647 kg/m$^3$ cement, 1293 kg/m$^3$ sand with particle size of 0-2 mm and 453 kg/m$^3$ water, the amount of water reducer adulteration is 0.75% cement content (solid content), set the pH-responsive polycarboxylic acid solution synthesized by the invention has a solid content is 0.3% of the cement content. Cement mortar without adding temperature-responsive polycarboxylic acid is used as the comparison with the same composition of rest components. The results of shrinkage test of mortar are shown in Table 2.

TABLE2

| polymer | adulterate amount % | 1 d [mm/m] | 7 d [mm/m] | 14 d [mm/m] | 28 d [mm/m] |
| --- | --- | --- | --- | --- | --- |
| Embodiment 7 | 0.3 | −0.03 | −0.20 | −0.37 | −0.51 |
| Embodiment 8 | 0.3 | −0.13 | −0.42 | −0.56 | −0.70 |
| Embodiment 9 | 0.3 | −0.06 | −0.35 | −0.40 | −0.62 |
| Embodiment 10 | 0.3 | −0.05 | −0.23 | −0.39 | −0.60 |
| Embodiment 11 | 0.3 | −0.10 | −0.41 | −0.52 | −0.66 |
| Embodiment 12 | 0.3 | −0.07 | −0.37 | −0.43 | −0.64 |
| comparison | 0 | −0.16 | −0.45 | −0.69 | −1.00 |

Table 2 indicates that the pH-responsive polycarboxylic acid synthesized by the embodiment of the invention can significantly inhibit the shrinkage of cement mortar, the principle of shrinkage reduction is to utilize the action of ph-responsive polymer blocks on the side chains of macromolecules, which is one of the most remarkable characteristics that distinguishes it from other concrete shrinkage reducing agents. In terms of shrinkage performance, the polymer synthesized by the embodiment of the present invention can effectively reduce the drying shrinkage of concrete, the reduction rate is better than the comparison in 1d, 7d, 14d and 28d.

What is claimed is:

1. A preparation method for synthesizing comb structure temperature-responsive or pH-responsive polycarboxylic acid via polymerization, grafting and hydrolysis, comprising the following steps:

(1) polymerization:

an organic solvent, acrylate and a chain transfer agent are added to a reactor, heating up to 50-120° C. with agitation, and then a mixture solution of an initiator and an organic solvent is introduced to the reactor by dropping for 1-12 hours; a polyacrylate solution is obtained as a polymerization product by reacting at a constant temperature of 50-120° C. for 1-6 hours after the dropping is completed;

(2) graft copolymerization:

adjust a temperature of the polymerization product obtained in step (1) to 50-100° C., and add a molecular weight regulator with 15-40 minutes agitation until the polymerization product and the molecular weight regulator are evenly mixed; then add a temperature-responsive or pH-responsive monomer and the mixture solution of the initiator and the organic solvent by dropping for 1-12 hours; after the dropping is completed, reaction is conducted at a constant temperature of 50-100° C. for 1-6 hours to obtain a graft copolymerization product after removing organic solvent by decompress distillation;

(3) hydrolysis reaction the graft copolymerization product in step (2) is mixed with deionized water and heated to 30-80° C. with agitation, add inorganic alkali and hydrolyzing for 10-150 minutes; then decompress distillation is conducted to remove water solvent and by-products; after drying, water solvent is added to obtain a temperature-responsive or pH-responsive polycarboxylic acid solution with desired concentration;

wherein the organic solvent used in the polymerization reaction in step (1) is tetrahydrofuran, N,N-dimethyl formamide, aniline, cyclobutyl sulfoxide or dimethyl sulfoxide, a mass ratio of the organic solvent to the acrylate is 1-12:1; the acrylate is methyl acrylate, ethyl acrylate, propyl acrylate, butyl acrylate or amyl acrylate; the chain transfer agent is isopropanol, isooctyl 3-mercapto propionate, 2-mercapto ethanol, or 3-mercapto propanol, a molar ratio between the chain transfer agent and the acrylate is 0.05-0.6:1; the initiator is azodiisobutyl nitrile, azodiisoheptyl nitrile, dibenzoyl peroxide, tert-butyl peroxide hydrogen peroxide, tert-butyl peroxide benzoate or tert-butyl peroxide, a molar ratio of the initiator to the acrylate is 0.05-0.2:1; in the mixture solution of the initiator and the organic solvent, the organic solvent is tetrahydrofuran, N,N-dimethyl formamide, aniline, cyclobutyl sulfoxide or dimethyl sulfoxide, a mass fraction of the initiator in the mixture solution is 5-50%;

the molecular weight regulator used in the graft copolymerization reaction in step (2) is N-dodecyl mercaptan, tertiary dodecyl mercaptan, mercaptoacetic acid or 3-mercaptopropionic acid, a molar ratio between the molecular weight regulator and the temperature-responsive or pH-responsive monomer is 0.05-0.3:1; the temperature-responsive monomer is N-Isopropyl acrylamide, N-n-propylacrylamide, N-tert-Butyl acrylamide, N, N'- methylene bisacrylamide, or N,N-dimethylacrylamide, a molar ratio between the temperature-responsive monomer and the acrylate in step (1) is 2-10:1; the pH-responsive monomer is dimethylamino-ethyl acrylate, dimethylamino-ethyl methacrylate, diethylamino-ethyl methacrylate, 2-vinyl pyridine, 4-vinyl pyridine or N, N-diethyl-2-acrylamide, a molar ratio between the pH-responsive monomer and the acrylate in step (1) is 2-10:1; the initiator used in the method is azodiisobutyl nitrile, azodiisoheptyl nitrile, dibenzoyl peroxide, tert-butyl peroxide hydrogen peroxide, tert-butyl peroxide benzoate or tert-butyl peroxide, a molar ratio between the initiator and the temperature-responsive or pH-responsive monomer is 2-10:1; the organic solvent in the mixture solution of the initiator and the organic solvent is tetrahydrofuran, N, n-dimethyl formamide, aniline, cyclobutyl sulfoxide or dimethyl sulfoxide, the mass fraction of initiator in the mixture solution is 5-50%;

a molar ratio between the deionized water used in the hydrolysis reaction in step (3) and the acrylate in step (1) is 1-10:1; the inorganic alkali is sodium hydroxide or potassium hydroxide, and a molar ratio between the inorganic alkali and the deionized water is 0.001-0.02:1.

2. A comb structure temperature-responsive or pH-responsive polycarboxylic acid prepared by the method according to claim 1, having the following structural expression:

where, as for the comb structure temperature-responsive polycarboxylic acid, $R_1$ represents N-isopropyl amide, N-Isopropyl methyl amide, N-n-propyl amide, N-tert-butyl amide, N,N'-methylene acrylamide amide, or N,N-dimethyl amide; $R_2$ represents hydrogen or methyl;

as for the comb structure pH-responsive polycarboxylic acid, $R_1$ represents dimethylamino ethoxycarbonyl, lignocaine ethoxycarbonyl, 2-pyridyl, 4-pyridyl, or N, N-diethyl-2-amide; $R_2$ represents hydrogen or methyl;

where a and b are positive integers indicating the number of repeating units distributed randomly in main molecular chains, a:b is 0.1-10:1;

where n is a positive integer indicating the number of repeat units in side molecular chains, a range of n is 5-120.

* * * * *